Sept. 20, 1960  F. C. MINCH  2,953,323
TWO-STAGE STEERING CONTROL SYSTEM FOR AIRCRAFT NOSEWHEEL
Filed Dec. 6, 1955
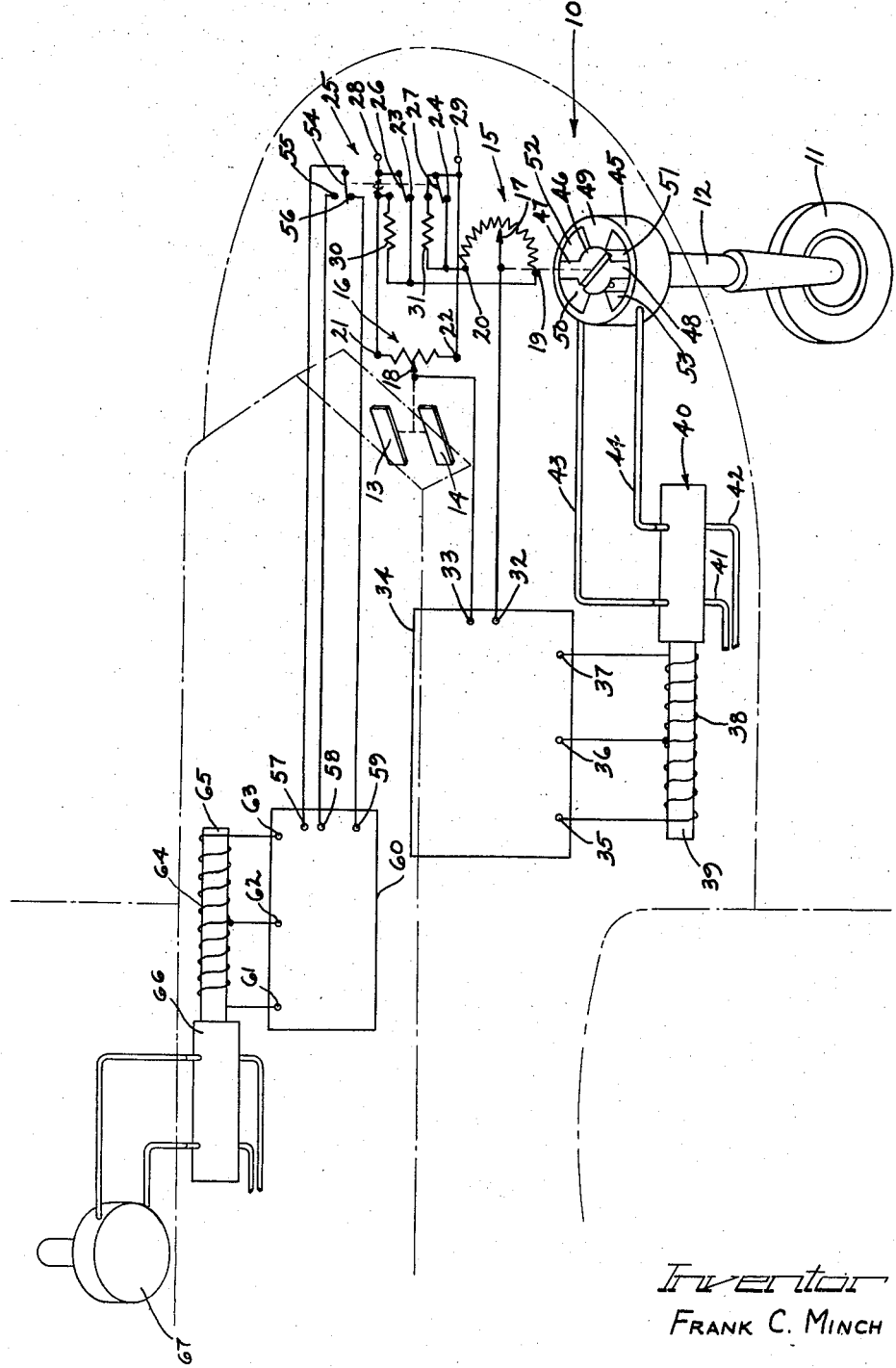
Inventor
FRANK C. MINCH

United States Patent Office 2,953,323
Patented Sept. 20, 1960

2,953,323

TWO-STAGE STEERING CONTROL SYSTEM FOR AIRCRAFT NOSEWHEEL

Frank C. Minch, Kenmore, N.Y., assignor to Houdaille Industries, Inc., Buffalo, N.Y., a corporation of Michigan Filed Dec. 6, 1955, Ser. No. 551,399

8 Claims. (Cl. 244—50)

This invention relates to a steering control system and more particularly to a power-actuated system for moving a steerable ground-engaging vehicle wheel to a position corresponding to the position of a manually actuatable control element.

In an exemplary application of this invention, the steerable nose wheel of an airplane is controlled by bars operated by the pilot's feet, which bars may also be used for controlling the rudder in flight. A pair of sensing devices are respectively connected to the nose wheel and the rudder bars to develop signals corresponding to the respective positions of the nose wheel and the rudder bars. Such signals are compared and applied to the input of suitable power-amplifying means having an output applied to an actuator for the nose wheel, to move the nose wheel until the signals are balanced with the position of the nose wheel then corresponding to the position of the rudder bars. The sensing devices are preferably electrical and most preferably are in the form of potentiometers connected in a bridge circuit with the movable contacts of the same connected to the nose wheel and the rudder bars. The power-amplifying means preferably comprises a magnetic amplifier coupled to a valve which controls a hydraulic actuator for the nose wheel.

Power-actuated steering systems and especially aircraft systems such as above described must be operated over a wide range of speeds. Aircraft systems, for example, must operate from 0 to as high as 150 miles per hour and higher, and problems have heretofore been encountered in obtaining satisfactory operational characteristics at all speeds.

It is an object of this invention to provide an improved power-actuated steering control system having optimum response characteristics in both high and low speed ranges.

Another object of this invention is to provide simple and reliable means for modifying the operation of a power-actuated system such as above described to obtain optimum response characteristics in both low and high speed ranges.

According to this invention, means are provided for adjusting the power-actuated system for a steerable wheel to obtain at high speeds a high ratio between a certain increment of movement of a control element and a corresponding increment of the wheel and to obtain a low ratio at low speeds.

The provision of such means is highly advantageous because at low speeds it is desirable that a given movement of the control element should result in a relatively large movement of the wheel so that sharp turns can be readily executed. However, a low ratio is very undesirable at high speeds because the system would be very sensitive and an "over control" condition would result especially when the steering is controlled by foot-operated rudder bars as is usual practice particularly in military aircraft. The provision of a low ratio at low speeds and a high ratio at high speeds therefore achieves optimum performance characteristics.

It may be further noted that elimination of "over control" is not only desirable from the standpoint of smoothness of operation but also from the standpoint of preventing failure of the system. This is true because the force required to produce a given movement of the steerable wheel, tending to change the direction of travel of the aircraft, increases as the speed increases and with an "over control" sensitive system, overloading of the power-actuating system is apt to result.

The adjustment from the low ratio to the high ratio can be accomplished in various ways. In a system such as above described utilizing sensing devices respectively responsive to the position of the wheel and the position of the control element, the coupling between the control element or the wheel and the associated sensing device could be adjusted. Preferably, however, and according to a specific feature of the invention, means are provided for adjusting at least one of the sensing devices. Such means are readily provided and are reliable in operation which is extremely important because of the fact that a steering system is involved.

In the case in which the sensing devices are in the form of potentiometers in a bridge circuit, the adjustment is effected by the simple expedient of providing a pair of resistors symmetrically connected in series with one of the potentiometers, which resistors are shorted out to shift from one ratio to the other. It should be noted that resistors are available which are extremely reliable in operation but switches are more inclined to be subject to failure, and with the circuit of this invention failure of the switches cannot render the system inoperative.

Preferably, the resistors are connected in series with the potentiometer associated with the wheel so that the system is sensitive in operation except when the switch means are operative to short out the resistors.

In accordance with a further feature of the invention, means are provided for indicating the speed of the vehicle and means are provided operated by such speed indicating means for selectively adjusting the power-actuated system to obtain at high speeds a high ratio between a certain increment of movement of the control element and a corresponding increment of movement of the wheel and a low ratio at low speeds.

In accordance with a specific feature of the invention, such speed indicating means are defined by means indicative of the position of the landing flaps (or other high lift devices) on aircraft wings. When an airplane is taxiing out to a position for a takeoff, the wing flaps are usually raised or retracted and are then lowered to provide a high lift for the takeoff. When an airplane lands, the wing flaps are, of course, lowered and after the landing is completed, the flaps are usually raised or retracted after which the airplane is taxied to an unloading position. It will be apparent that the airplane is thus operated at high speeds when the flaps are lowered and at low speeds when the flaps are raised or retracted. According to this invention, means are provided for obtaining a high steering sensitivity when the flaps are raised and a low sensitivity when the flaps are lowered.

Usually, an electrical switch device is used to control the wing flaps and according to a further specific feature of the invention, such switch means are provided with an additional pole or poles for controlling the sensitivity of the power-actuated system.

It will thus be apparent that this invention provides simple and highly reliable means for modifying the operation of a power-actuated steering system to obtain optimum response characteristics at both high and low speeds.

This invention contemplates other and more specific objects, features and advantages which will become more fully apparent from the following detailed description taken in conjunction with the accompanying drawing which is a diagrammatic illustration of an aircraft steering control system constructed in accordance with the principles of this invention.

Reference numeral 10 generally designates an airplane steering control system constructed according to this invention which is used to control the position of an airplane nose wheel 11 supported from a shaft 12, the shaft 12 being disposed in a generally vertical position when the airplane landing gear is lowered.

The angular position of the shaft 12 and hence the steering of the airplane is controlled by a manually actuatable control element in the form of a pair of bars 13 and 14 which may be operated by the pilot's feet and are preferably also used to control the rudder of the airplane in flight. The shaft 12 and the rudder bars 13, 14 are connected to a pair of sensing devices generally designated by reference numerals 15 and 16 which are arranged to develop signals corresponding to the respective positions of the nose wheel and rudder bars. Such signals are compared, amplified and applied to an actuator for the nose wheel to move the nose wheel until the signals are balanced with the position of the nose wheel then corresponding to the position of the rudder bars.

The sensing devices 15 and 16 are preferably electrical and most preferably are in the form of potentiometers having movable contacts 17 and 18 mechanically coupled to the shaft 12 and rudder bars 13, 14 and having end terminals 19, 20 and 21, 22. The terminals 19 and 20 are connected to fixed or stationary contacts 23 and 24 of a switch 25 having movable contacts 26 and 27 connected to terminals 28 and 29 and the terminals 21 and 22 are connected directly to the terminals 28 and 29. A suitable source of electrical current, preferably alternating current, is connected to the terminals 28 and 29 and a signal is developed between the movable potentiometer contacts 17 and 18 corresponding in sense and magnitude to any deviation in the position of the shaft 12 relative to the position of the rudder bars 13, 14. In the alternative, a source of current could be applied between the movable contacts 17, 18 and an output signal would be developed between the terminals 28, 29.

To control the sensitivity of the system, a pair of resistors 30, 31 are symmetrically connected in series between the potentiometer terminals 19, 20 and the supply terminals 28, 29. The resistors 30, 31 are selectively shorted out by operation of the switch 25.

The movable potentiometer contacts 17 and 18 are connected to input terminals 32 and 33 of an amplifier 34, preferably a magnetic amplifier. The amplifier 34 has output terminals 35, 36 and 37 connected to the coil 38 of a solenoid having an armature 39 arranged to actuate a control valve 40. The control valve 40 is connected through conduits 41 and 42 to supply and return points in a fluid pressure system. The control valve 40 is also connected through conduits 43 and 44 to a hydraulic actuator 45 for the nose wheel 11.

The actuator 45 may comprise a rotor 46 secured to the shaft 12 and having a pair of vanes 47 and 48 movable in a stationary housing 49. Fluid under pressure supplied to the conduit 43 flows into chambers 50 and 51 in the housing 49 and acts against the vanes 47 and 48 to rotate the rotor 46 and shaft 12 in one direction (clockwise as viewed from above), with the vanes 47 and 48 acting to force fluid out of chambers 52 and 53 into the conduit 44. Fluid under pressure supplied to the conduit 44 will, of course, rotate the rotor 45 and shaft 12 in a reverse direction.

In operation of the system, it may be assumed that both contacts 17 and 18 are in a neutral position with the signals from the sensing potentiometers being balanced and with no signal being applied to the amplifier 34. If the right rudder bar 14 is depressed, the potentiometer 18 will move toward the terminal 22 to develop an unbalanced condition and apply a signal to the amplifier 34 which acts to move the control valve 40 in a direction such that the supply conduit 41 is coupled to the conduit 43, with the return conduit 42 coupled to the conduit 44. This will cause the rotor 46 to rotate in a clockwise direction until the signal from the sensing potentiometer 15 balances the signal from the sensing potentiometer 16. The operation is, of course, reversed when the left rudder bar 13 is depressed.

With the contacts 17 and 18 moved in such a manner that a balanced condition is maintained with no voltage developed to be applied to the amplifier 34, it can be shown that the ratio of an increment of movement of the contact 18 to a corresponding increment of movement of the contact 17 is decreased when the resistors 30, 31 are in the circuit and such ratio is increased when the resistors 30, 31 are shorted out. A high ratio is, of course, desirable at high speeds and a low ratio at low speeds. Accordingly, the resistors 30, 31 should be in the circuit at low speeds and shorted out at high speeds.

An important feature of the invention is in the provision of speed indicating means arranged to control the change from one ratio to another. In the system 10, this is achieved by using the switch 25 for controlling the position of landing flaps of the airplane. As explained above, the wing flaps are lowered during landing and takeoff of the airplane, i.e. while the airplane is moving at relatively high speeds, but the flaps are retracted or elevated when taxiing at relatively low speeds on the landing field. Hence, the position of the wing flap control is indicative of the ground speed of the airplane and the switch 25 is preferably used as such a control.

As illustrated, the switch 25 has a third movable contact 54 selectively engageable with stationary contacts 55 and 56, the contacts 54, 55 and 56 being connected to terminals 57, 58 and 59 of a control and amplifying unit 60 having output terminals 61, 62 and 63 connected to the coil 64 of a solenoid having an armature 65 connected to a control valve arranged to control flow of fluid to and from a hydraulic actuator 67 for a wing flap. It will be understood that a similar control arrangement is used for the flap of the other wing of the airplane. The wing flap control system operates in such a fashion that when the contact 54 is engaged with the contact 55, the wing flap will be retracted and the resistors 30, 31 will be in the circuit so that the steering system will have a sensitive response characteristic as is desirable for low speed operation. When the contact 54 is engaged with the contact 56, the wing flap will be lowered for takeoff or landing of the airplane, and the resistors 30, 31 will be shorted out so that the steering system will have the proper response characteristic for high speed operation. It may be noted that if the steering system does not have the proper response characteristic or "feel," it will indicate to the pilot that the wing flaps are not in the proper position.

It will thus be apparent that this invention provides simple and highly reliable means for modifying the operation of a power-actuated steering system to obtain optimum response characteristics at both high and low speeds.

It will be understood that modifications and variations may be effected without departing from the spirit and scope of the novel concepts of this invention.

I claim as my invention:

1. In a control system for a steerable ground-engaging vehicle wheel, a manually actuatable control element, a power-actuated system for actuating said wheel to a position corresponding to the position of the control element, and means for selectively adjusting said power-actuated system for obtaining at high speeds a high ratio between a certain increment of movement of said element and a corresponding increment of movement of said wheel and a lower ratio at low speeds, 2. In a control system for a steerable ground-engaging vehicle wheel, a manually actuatable control element, a pair of sensing devices arranged to develop signals respectively corresponding to the position of said wheel and the position of said control element, power amplification means having an input responsive to any differential between said signals, an actuator for said wheel actuated by said power amplification means, and means for selectively adjusting the operation of one of said sensing devices for obtaining at high speeds a high ratio between a certain increment of movement of said element and a corresponding increment of movement of said wheel and obtaining a lower ratio at low speeds.

3. In a control system for a steerable ground-engaging vehicle wheel, a manually actuatable control element, a pair of sensing devices arranged to develop signals respectively corresponding to the position of said wheel and the position of said control element, power amplification means having an input responsive to any differential between said signals, an actuator for said wheel actuated by said power amplification means, and means for selectively adjusting the operation of the system for obtaining at high speeds a high ratio between a certain increment of movement of said element and a corresponding increment of movement of said wheel and obtaining a lower ratio at low speeds.

4. In a control system for a steerable ground-engaging vehicle wheel, an actuator for controlling the position of said wheel, a manually actuatable control element, a pair of potentiometers having movable contacts respectively connected to said wheel and said element and connected in a bridge circuit to develop an output electrical signal corresponding in magnitude and sense to any differential in the corresponding positions of said wheel and said element, an amplifier having an input responsive to said output electrical signal and an output arranged to control said actuator, and means for selectively adjusting the operation of the system to obtain at high speeds a high ratio between a certain increment of movement of said element and a corresponding increment of movement of said wheel and obtaining a lower ratio at low speeds.

5. In a control system for a steerable ground-engaging vehicle wheel, an actuator for controlling the position of said wheel, a manually actuatable control element, a pair of potentiometers having movable contacts respectively connected to said wheel and said element and connected in a bridge circuit to develop an output electrical signal corresponding in magnitude and sense to any differential in the corresponding positions of said wheel and said element, an amplifier having an input responsive to said output electrical signal and an output arranged to control said actuator, a pair of resistors symmetrically connected in series with one of said potentiometers, and means for selectively shorting out said resistors to change the ratio between an increment of movement of said element and a corresponding increment of movement of said wheel.

6. In a control system for a steerable ground-engaging vehicle wheel, an actuator for controlling the position of said wheel, a manually actuatable control element, a pair of potentiometers having movable contacts respectively connected to said wheel and said element and connected in a bridge circuit to develop an output electrical signal corresponding in magnitude and sense to any differential in the corresponding positions of said wheel and said element, an amplifier having an input responsive to said output electrical signal and an output arranged to control said actuator, a pair of resistors symmetrically connected in series with the potentiometer associated with said wheel, and means for selectively shorting out said resistors to change the ratio between an increment of movement of said element and a corresponding increment of movement of said wheel.

7. In an airplane having wing flaps and a steerable ground-engaging wheel, means for controlling said wing flaps, a manually actuatable steering control element, a power-actuated system for actuating said wheel to a position corresponding to the position of said control element, and means responsive to movement of the wing flaps for adjusting said power-actuated system for obtaining a high ratio between a certain increment of movement of said element and a corresponding increment of movement of said wheel when the flaps are lowered and a low ratio when said flaps are raised.

8. In an airplane having wing flaps and a steerable ground-engaging wheel, a pair of potentiometers having movable contacts respectively connected to said wheel and said element and connected in a bridge circuit to develop an output electrical signal corresponding in magntiude and sense to any differential in the corresponding positions of said wheel and said element, an amplifier having an input responsive to said output electrical signal and an output corresponding to said signal, an actuator for said wheel controlled by said amplifier output, a pair of resistors symmetrically connected in series with one of said potentiometers, and a switch arranged to control the wing flaps and having contact means for selectively shorting out said resistors.

References Cited in the file of this patent

UNITED STATES PATENTS

| | | |
|---|---|---|
| 2,270,875 | Hanson | Jan. 27, 1942 |
| 2,452,311 | Markusen | Oct. 26, 1948 |
| 2,578,897 | Oliver | Dec. 18, 1951 |
| 2,734,589 | Groen | Feb. 14, 1956 |